(12) United States Patent
Skinner et al.

(10) Patent No.: X9381
(45) Date of Patent: Feb. 10, 1836

(54) STRAW CUTTER

(76) Inventors: Chauncey D. Skinner; Dana Read

Chauncey D. Skinner & Dana Read.

Letters Patent.

The schedule referred to in these Letters Patent, and making part of the same, containing a description in the words of the said Chauncey D. Skinner and Dana Read themselves of their improvements in the Machine for cutting Straw and other substances.

To all To whom these presents shall come: Be it known that we Chauncey D. Skinner, of Haddam in the County of Middlesex and State of Connecticut, and Dana Read of Middletown in said County, have invented a new and useful improvement in Machinery for cutting straw, hay, stalks of maize, and similar substances and that the following is a full and exact description of the construction and operation of the said Machine as invented or improved by us. A frame of any suitable wood is made by setting up two end pieces of plank each two feet nine inches high and one inch & one half of an inch thick at the distance of two feet and seven inches from each other in the clear. These end pieces are each one foot wide at the bottom, and continue of that width to within about seven inches from the top, where they are formed with a gradual increase of width in front; the top of the end piece on the right being one foot and four inches wide, and the top of the end piece on the left being one foot and three inches wide; This latter end piece for the sake of firmness is set by mortising into a foot two feet long, three inches wide, and three inches thick. The end pieces are connected together on the back side by two girths one about five inches from the bottom, and the other even with the top, each about five inches wide and one inch and one fourth of an inch thick, and well secured by nails or screws. The end pieces are connected in front by a similar girth secured in the like manner first below the points where the width width of the end-pieces begins to increase upon the frame thus
constructed is set a wooden feeding box or trough let down one
inch into the end pieces and laid even with the front. this trough
is three feet four inches long open on the top and at both ends seven
inches wide in the clear at the right end, and diminishing gradually
in width to the left end which is five inches wide. the depth of
the trough is seven inches at the wider end, and decreases gradually
towards the other end which is four inches deep. at the smaller
end of this trough a piece of board six inches long and one inch
thick is fitted (by means of pivots or wooden pins) as a cap [illegible]
lying horizontally even with the top, when the trough is full
and capable of being readily depressed with the hand as the hair
or other substance diminished, for the purpose of holding it fast
The trough is so laid that it projects beyond the left end piece
only so as to clear it. At the distance of eight inches in the
clear from the left end piece, a cross girth passes under the
trough to which one end is fastened by screws, and the other end
is tenoned in to the back top girth of the frame. into this cross
girth and the left end piece, a square iron crank shaft three
fourths of an inch in diameter, and fourteen inches long with
a sweep of six inches, is set at the distance of about four inches
from the back of the trough in such a manner that the bottom of
the trough is on a level with the shaft which runs in iron boxes
capped with iron. The end of the shaft extends beyond the left end piece
of the frame three inches and one fourth of an inch, and is fixed into
a wheel made of oak wood two feet in diameter and two inches thick.
To prevent this wheel from warping a piece of board four inches wide
and three fourths of an inch thick is dovetailed into the outside
area passing through the diameter so as best to counteract any bias
in the wood of which the wheel is composed. A pitman of large
iron wire is attached to the end of the crank. The lower end of the
pitman is secured in any convenient manner to the upper side
of a wooden treddle two feet long, which extends horizontally from
the the lower back girth of the frame, and is fastened thereto by a [illegible]
hinge joint. The wheel being set in motion by the foot acting upon
the treadle revolves towards the front. A knife nine inches long and
one eighth of an inch thick at the back with its edge turned towards
the trough is set on the inner area of the wheel, parallel with the [illegible]
resting at the ends upon small iron blocks to which it is [illegible]
screwed, and which are themselves screwed to the wheel
in such a manner and position that when the end of the crank
being raised vertically is just upon the point of descending, the
edge of the knife is nearly level with the top of the trough, each of the
blocks on which the knife rests is five eighths of an inch thick; and
the knife in revolving is thus brought into contact with a plate of [illegible]
steel or iron placed at the end of the trough and on the bottom thereof
so as to form a sort of shears for cutting the straw or other substance in the
trough. The side of the knife next the trough is straight and is bevelled
on the other side. The edge of the knife is somewhat curved inwards. The
periphery of the wheel is covered with leather [illegible] with emery for
sharpening the knife; and to this end a screw driver accompanies
the machine so that the knife may be taken off and put on at [illegible]
pleasure. It is obvious also, that the wheel may be used for sharpen-
ing other tools. The machine is operated by one person who keeps
the wheel in motion with his feet while he supplies the trough [illegible]
with the straw or other substance to be cut, and adjusts it with
his hands. The motion may be produced if desirable, by any other competent
power. The machine above described is of the dimensions, which we
usually make; but the dimensions and proportions may evidently
be increased or diminished to suit the convenience of the operator.
The advantages of the machine are that it is portable, simple in its
construction, not liable to get out of order, and capable of being
repaired with small expense and trouble. We do not claim as
our invention or improvement, any one of the parts of the said
Machine separately considered, but we do claim as our inven-
tion and improvement the combination of the various parts of of the said Machine as above described in the said manner, whereby to produce the effect of cutting straw, hay, stalks of maize and like substances with ease and rapidity.

Dated at Middletown the 21st day of December A.D. 1835

Witnesses
Townsend May
Jonathan Barnes

Chauncey D. Skinner
Dana Read 1313 n.d.

Ed.
Cf/IV.